(12) United States Patent
Lee

(10) Patent No.: US 11,028,588 B2
(45) Date of Patent: Jun. 8, 2021

(54) REBAR COUPLER

(71) Applicant: Hyun Uk Lee, Busan (KR)

(72) Inventor: Hyun Uk Lee, Busan (KR)

(73) Assignee: N C COUPLER LLC, Irvine, CA (US)

( * ) Notice: Subject to any disclaimer, the term of this patent is extended or adjusted under 35 U.S.C. 154(b) by 574 days.

(21) Appl. No.: 16/064,142

(22) PCT Filed: Dec. 18, 2017

(86) PCT No.: PCT/KR2017/014946
§ 371 (c)(1),
(2) Date: Jun. 20, 2018

(87) PCT Pub. No.: WO2018/236017
PCT Pub. Date: Dec. 27, 2018

(65) Prior Publication Data
US 2019/0093362 A1    Mar. 28, 2019

(30) Foreign Application Priority Data
Jun. 21, 2017   (KR) .......................... 10-2017-0078361

(51) Int. Cl.
*E04C 5/16* (2006.01)
*F16B 7/04* (2006.01)

(52) U.S. Cl.
CPC ............ *E04C 5/165* (2013.01); *F16B 7/0406* (2013.01); *F16B 7/0426* (2013.01)

(58) Field of Classification Search
CPC ...... E04C 5/165; F16B 7/0406; F16B 7/0426; F16B 5/0275; F16B 37/0857
See application file for complete search history.

(56) References Cited

U.S. PATENT DOCUMENTS

| | | | | |
|---|---|---|---|---|
| 3,049,775 A | * | 8/1962 | Ondeck ................... | E04C 5/122 403/365 |
| 2005/0097843 A1 | * | 5/2005 | Giesel ..................... | E04C 5/122 52/223.1 |

(Continued)

FOREIGN PATENT DOCUMENTS

| WO | WO-2007061240 A1 * | 5/2007 | ............. E04C 5/165 |
|---|---|---|---|
| WO | WO-2011030973 A1 * | 3/2011 | ............. E04C 5/165 |

(Continued)

*Primary Examiner* — Adriana Figueroa
(74) *Attorney, Agent, or Firm* — Patent Office of Dr. Chung Park

(57) ABSTRACT

Disclosed is a rebar coupler. The rebar coupler includes a housing having first and second openings for receiving first and second rebars, respectively, and a partition disposed at a center; a mounting member inserted in each end of the housing and receiving rebars therein; a plurality of coupling members slidably disposed on the mounting member and being brought into contact with an outer peripheral surface of the inserted rebars to prevent the rebars from moving out from the rebar coupler; a resilient member configured to apply a restoring force to the coupling members so that the coupling members slid by the rebar inserted in the mounting member are returned to an original position; and a cover fastened to both ends of the housing to prevent the mounting member and the coupling members from moving out from the housing due to a tensile force of the rebar.

10 Claims, 7 Drawing Sheets

(56) References Cited

U.S. PATENT DOCUMENTS

2010/0303540 A1\* 12/2010 Kim ................. E04C 5/165
  403/305
2013/0230350 A1\* 9/2013 Kim ................. E04C 5/166
  403/327

FOREIGN PATENT DOCUMENTS

| WO | WO-2012046931 A1 | * | 4/2012 | ............. | E04C 5/165 |
| WO | WO-2014069848 A1 | * | 5/2014 | ............. | E04C 5/166 |
| WO | WO-2014123298 A1 | * | 8/2014 | ............. | E04C 5/165 |

\* cited by examiner

REBAR COUPLER

CROSS-REFERENCE TO PRIOR APPLICATIONS

This application is a national Stage Patent Application of PCT International Patent Application No. PCT/KR2017/014946, filed on Dec. 18, 2017 under 35 U.S.C. § 371, which claims priority of Korean Patent Application No. 10-2017-0078361, filed on Jun. 21, 2017, which are all hereby incorporated by reference in their entirety.

TECHNICAL FIELD

The present invention relates to a coupler for reinforcing bars (rebars), and more particularly, to a rebar coupler capable of selectively extending a usable length of a rebar by connecting two rebars together.

BACKGROUND ART

In general, a reinforced concrete structure is a construction mixed with concrete and rebars to compensate advantages and disadvantages of the concrete and the rebars. The rebars are embedded in specific regions of the concrete to resist tensile stresses applied to the concrete.

Since typical concrete has high resistance to compression stresses, but remarkably low resistance to tensile stresses, i.e., tensile strength, any appreciable tension stress will break a rigid lattice, resulting in cracking and separation of the concrete. If reinforcing bars (rebars) are disposed in the concrete, the reinforced concrete resists not only compression stresses by virtue of the concrete, but also direct tensile stresses by virtue of the rebars, thereby improving durability of the concrete if an external force is applied thereto.

As the reinforced concrete structures become bigger and higher recently, a length of the rebars embedded in the concrete is relatively extended. Since the rebar is a standardized product of a constant length and thus the length is limited, a process of joining a plurality of rebars together is necessary on site according to the wanted height of the structure.

The joining process is carried out by various methods, i.e., lap splice to bind two overlapped rebars by a binding wire, gas pressure welded joint, and mechanical joint.

The lap splice is at risk for high-storied buildings due to lower durability. The gas pressure welded joint is not stable since a heated portion may be cracked due to heat deformation.

The mechanical joint or connection that can be easily installed is recently used, as well as having the durability which is a drawback of the lap slice and the gas pressure welded joint. Various rebar joining devices which are a typical example of the mechanical joint have been developed and studied, and also are commercially available.

A recently developed rebar joining device among the mechanical joints is configured to connect one rebar having a male threaded portion at one end and the other rebar having a female threaded portion at one end by rotating the rebars or a coupler. However, as the weight or thickness of the rebars is increased, there are problems in that construct ability is deteriorated, and working time required for connecting the rebars is increased.

DISCLOSURE

Technical Problem

Accordingly, the present invention has been made in view of the above-mentioned problems, and one object of the present invention is to provide a rebar coupler capable of joining rebars together in one-touch manner by the coupler to easily extend a usable length, and providing a connecting portion with a connecting force higher than a tensile stress threshold of the rebar.

Technical Solution

To accomplish the above-mentioned object, according to one aspect of the present invention, there is provided A rebar coupler including: a housing which is a cylindrical hollow body having at one end a first opening for receiving a first rebar, at the other end a second opening for receiving a second rebar, to connect the first rebar and the second rebar, and a partition disposed at a center thereof to divide the ends having the first and second openings; a mounting member inserted in each end of the housing and receiving rebars therein; a plurality of coupling members slidably disposed on the mounting member and being brought into contact with an outer peripheral surface of the inserted rebars to prevent the rebars from moving out from the rebar coupler; a resilient member configured to apply a restoring force to the coupling members so that the coupling members slid by the rebar inserted in the mounting member are returned to an original position; and a cover fastened to both ends of the housing to prevent the mounting member and the coupling members from moving out from the housing due to a tensile force of the rebar, the mounting members having a plurality of guide portions for guiding sliding movement of the coupling members along an inserting direction of the rebar, a flange connecting ends of the guide portions, and a contact portion protruding from the flange towards the coupling members.

The contact portion may be integrally formed with the flange, but is made from a material different from that of the flange.

The contact portion may have first surfaces protruding from areas between the guide portions to be brought into contact with the coupling members, second surfaces disposed between the flange and the contact portion to be opposite to the first surfaces, and third surfaces for connecting both ends of the first surface and the second surface and deformed to correspond to a width of deformations of the rebar if the first surfaces are pressed.

The third surface may be formed in a shape of a slope or an arc.

The mounting member may be provided with a spacing between the coupling members and the flange or between the contact portion and the guide portions in order to correspond to elastic deformation of a shape of the contact portions.

The contact portion may contain at least one of rubber, silicon and a synthetic resin having elasticity.

An inner peripheral surface of the coupling member may be provided with a threaded portion of a desired pattern which is brought into contact with an outer peripheral surface of the rebar.

A tooth angle of the threaded portion of the coupling member may be set in the range of 50 to 75°.

A tooth pitch of the threaded portion of the coupling member may be set in the range of 0.4 to 1.3 mm.

At least one of the housing, the mounting member, the coupling member, the resilient member and the cover may be made from a composite material containing at least one of glass fiber and a carbon fiber.

Advantageous Effects

According to the present invention, the rebar coupler has the following advantages:

The rebars can be easily connected to each other in one-touch manner;

Since the rebars are easily connected to each other, a working time can be reduced, and thus installation costs can be also decreased;

The coupling members are resilient slid by resilient member in the housing, and also the coupling members are elastically supported by the contact portions, so that the coupling members can be brought into precisely contact with the rebars. Therefore, the rebar coupler can be applied to various shapes of the rebars;

The rebar coupler can be widely applied to joint portions of other steel bar, as well as the reinforcing bars; and Since the rebar coupler provides a connecting force stronger than mechanical strength of the rebar to compression stress or tensile stress, it is possible to connect the rebars in a safe and firm manner.

BRIEF DESCRIPTION OF REFERENCE NUMERALS

Figure 1:
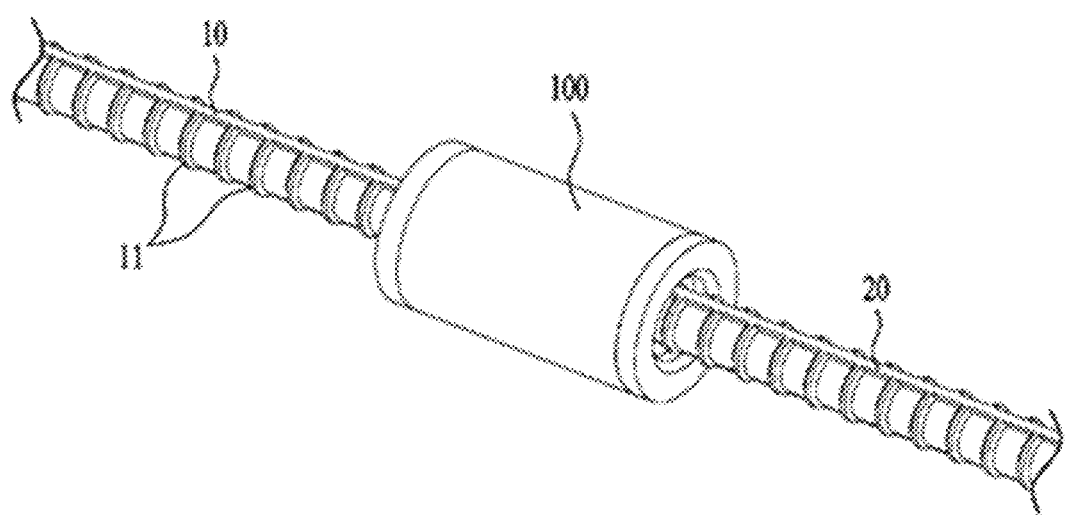
FIG. 1 is a perspective view illustrating a rebar coupler according to one embodiment of the present invention.

100: Rebar Coupler
110: Housing
111: First Opening
112: Second Opening
113: Partition
120: Mounting Member
121: Guide Portion
122: Flange
123: Contact Portion
130: Coupling member
140: Resilient Member
150: Cover
10: First Rebar
11: Deformation
20: Second Rebar Mode for Invention Hereinafter, an embodiment of the present invention is explained in detail in conjunction with the accompanying drawings so that those skilled in the art can easily carry out the present invention. In the following description, like reference numerals are attached to elements identical to those throughout the embodiment, and the description thereof is omitted herein. In the following description, detailed descriptions of well-known functions or constructions will be omitted since they would obscure the invention in unnecessary detail. The accompanying drawings are used to help easily understand the technical idea of the present invention, and it should be understood that the idea of the present invention is not limited by the accompanying drawings.

Figure 2:
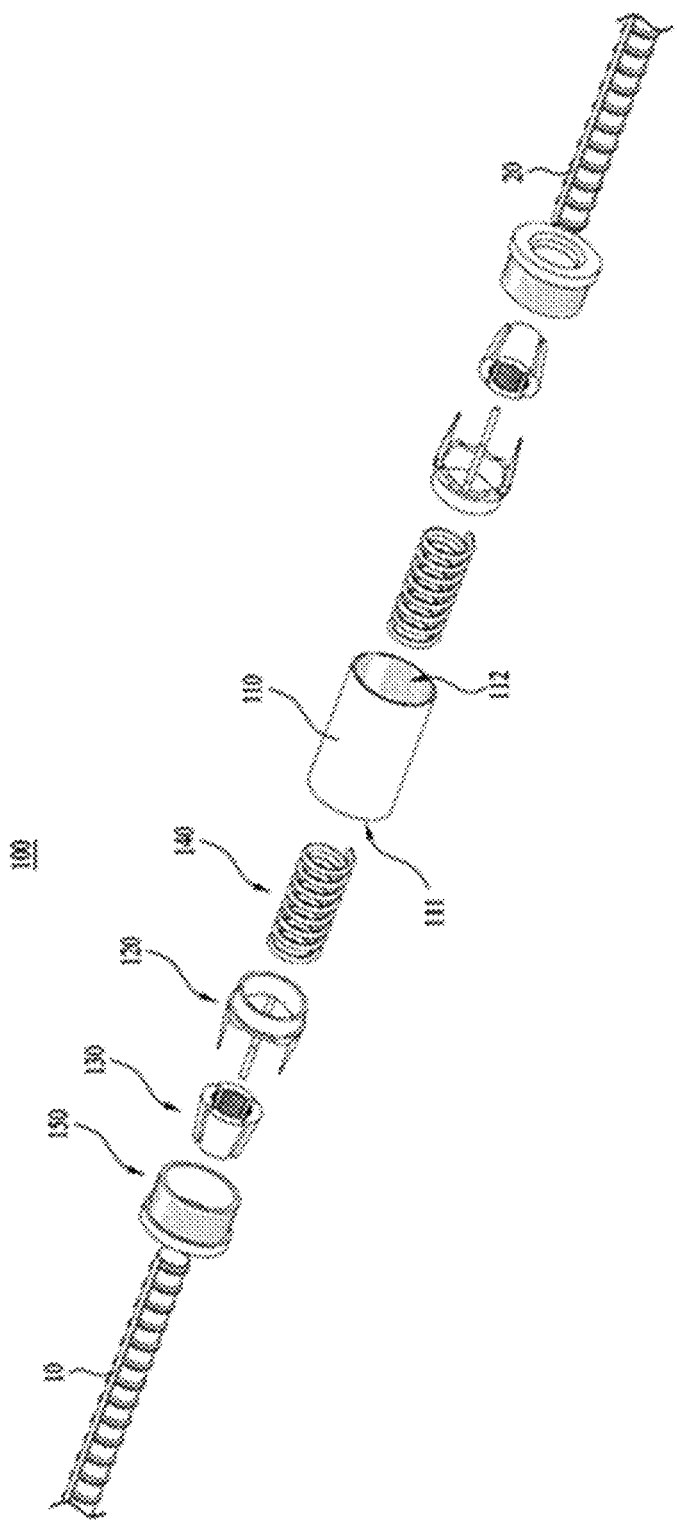
FIG. 2 is an exploded perspective view illustrating the rebar coupler in FIG. 1.

FIG. 1 is a perspective view illustrating a rebar coupler according to one embodiment of the present invention. FIG. 2 is an exploded perspective view illustrating the rebar coupler in FIG. 1.

Referring to FIGS. 1 and 2, a rebar coupler 100 according to one embodiment of the present invention is to provide a function of inserting one end of one rebar 10 and one end of the other rebar 20 into the coupler in a one-touch manner to splice the rebars together so that two adjacent rebars can be used as one rebar.

It would be noted that if the size of the rebar coupler 100 is changed, steel solid pipes or steel hollow pipes can be connected to each other by use of both ends of the rebar coupler. The rebar coupler can connect round steel bars with no deformations 11 on a surface thereof or deformed steel bars with ribs and deformations 11 on a surface thereof, but is preferably applied to the deformed steel bar in view of the connection force of the rebar coupler 100.

To the end, the rebar coupler 100 according to the present invention includes a cylindrical hollow housing 110, mounting members 120 inserted in both ends of the housing 110, a coupling member 130 placed on each mounting member 120, a resilient member 140 for applying a restoring force to each mounting member 120, and covers 150 engaged to both ends of the housing 110.

The housing 110 is a cylindrical hollow body having at one end a first opening 111 for receiving a first rebar 10, and at the other end a second opening 112 for receiving a second rebar 20, to connect the first rebar 10 and the second rebar 20.

The cylindrical hollow housing 110 is made from a steel material or a composite material containing at least one of glass fiber and a carbon fiber, and has a desired thickness to correspond to a tensile stress of the rebar. Herein, it should be noted that the first rebar 10 and the second rebar 20 indicate reinforcing bars to be connected to extend the length of the rebar.

The cylindrical hollow housing 110 is formed with female threaded portions on inner peripheral surfaces of both ends, to which the cover 150 is threadedly engaged, and has a partition 113 at an inner center thereof to separate the first opening 111 and the second opening 112.

Although FIG. 1 shows the cylindrical hollow housing 110 connects the first rebar 10 and the second rebar 20 in a straight line along a longitudinal direction thereof, the housing 110 may be bent at a desired angle so that extending directions of the first rebar 10 and the second rebar 20 are different from each other, or the housing 110 may be provided with a plurality of openings (not illustrated) to connect at least three rebars.

The rebar coupler 110 is preferably manufactured to have a standardized size corresponding to a kind, a size and a material of the rebar defined by KSD 3504 (rod steel for reinforced concrete), but it can be manufactured to have a nonstandard size according to a specific structural design.

Although not illustrated in the drawings, the partition 113 may be formed with a drain hole through which water flows between the first opening 111 and the second opening 112. The drain hole is configured to prevent water from storing in the housing in the state in which the rebars are connected to each other by the rebar coupler 100. Of course, the drain hole has a size to prevent the rebar from passing.

Figure 3:
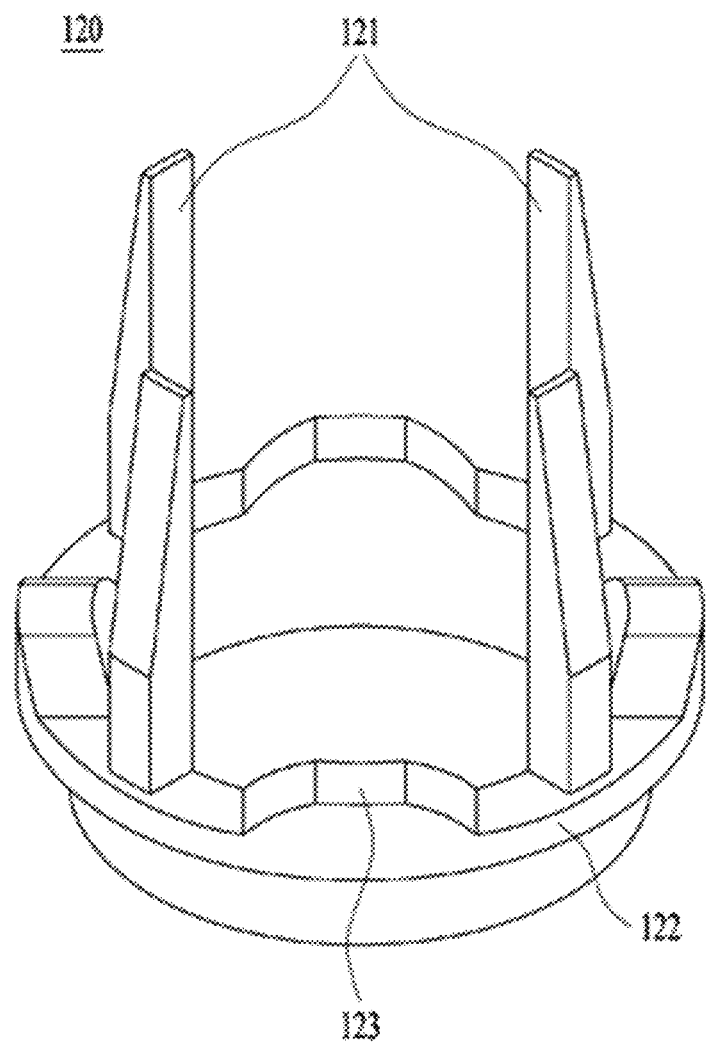
FIG. 3 is a perspective view illustrating a mounting member of the rebar coupler in FIG. 2.
Figure 4:
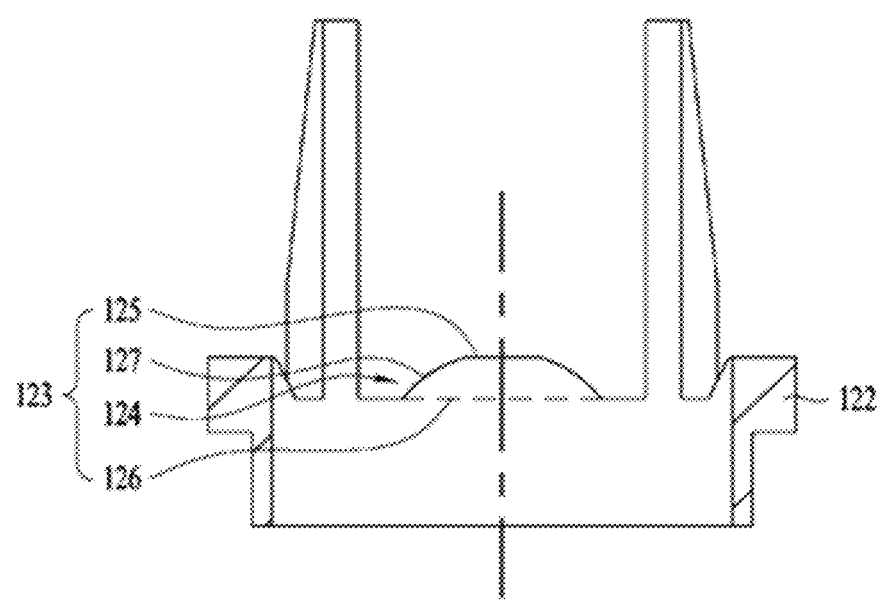
FIG. 4 is a side view illustrating the mounting member of the rebar coupler in FIG. 3.

FIG. 3 is a perspective view illustrating the mounting member of the rebar coupler in FIG. 2. FIG. 4 is a side view illustrating the mounting member of the rebar coupler in FIG. 3.

Referring to FIGS. 3 and 4, the mounting member 120 has guide portions 121 for guiding sliding movement of the coupling members 130, a flange 122 formed with the guide portions 121 to connect the guide portions, and a contact portion 123 protruding from the flange 122 towards the coupling members 130.

The mounting member 120 is resiliently mounted on each of the first opening 111 and the second opening 112, and receives the rebar inserted in the respective openings.

The guide portions 121 are configured to guide slidably reciprocating movement of the coupling members 130 along an inserting direction of the rebar 10. A plurality of guide portions 121 are preferably arranged on the flange 122 at equal angles or constant intervals. In this embodiment, four guide portions 121 are illustrated and explained.

The guide portion 121 may be formed to be flat, curved or inclined according to shapes of an inner peripheral surface of the housing 110 and an inner peripheral surface of the cover 150.

The flange 122 is formed to correspond to an inner cross-sectional shape of the housing 110. For example, since the housing 110 is formed in the shape of the hollow cylinder in this embodiment, the flange 22 is formed to have a shape of a circular cross section. One side of the flange 122 is provided with the guide portions 121, and the other side is engaged with the resilient member 140. Accordingly, the mounting member 120 is slidably disposed in the housing 110 by the resilient restoring force of the resilient member 140. Also, as the mounting member 120 is slid, the coupling members 130 disposed on the guide portions 121 are also slid.

The guide portions 121 are integrally formed with the flange 122, and are made of the same material as that of the flange. The guide portions 121 and the flange 122 may be made from a steel material or a composite material containing at least one of glass fiber and a carbon fiber.

The contact portion 123 is integrally formed with the flange 122, but is made from a material different from that of the flange 122. The material of the contact portion 123 contains at least one of rubber, silicon and a synthetic resin having elasticity. Accordingly, if the contact portion 123 is brought into contact with the coupling members 130, the shape of the contact portion 123 is elastically deformed by pressure of the coupling members 130 to absorb a shock, and the plurality of coupling members 130 are brought into precisely contact with or are supported by the shape of an outer peripheral surface of the rebar. The mounting member 120 is provided with a spacing between the coupling members 130 and the flange 122 or between the contact portion 123 and the guide portions 121 in order to correspond to the elastic deformation of the shape of the contact portions 123.

The contact portion 123 has first surfaces 125 protruding from an area between the guide portions 121 to be brought into contact with the coupling members 130, second surfaces 126 disposed between the flange 122 and the contact portion 123 to be opposite to the first surface 125, and third surfaces 127 for connecting both ends of the first surface 125 and the second surface 126 and deformed to correspond to a width of deformations of the rebar if the first surfaces 125 are pressed.

The first surface 125 is preferably formed to have a cross-sectional area smaller than that of the second surface 126. This is to form the spacing 124, and if a volume of the spacing 124 is minimized, the first surface 125 may be formed to have a cross-sectional area equal to or larger than that of the second surface 126.

The third surface 127 is formed in the shape of a slope or an arc. Therefore, if the first surface 125 is pressed and then comes close to the second surface 126, the shape of the third surface 127 can be easily elastically deformed in a direction perpendicular to a pressing direction. In this instance, a deformable range of the shape of the third surface 127 is selected in such a way that the shape is deformed by a height corresponding to the width of the deformation formed on an outer peripheral surface of the rebar in a direction perpendicular to a longitudinal direction of the rebar. Since the height of the contact portion 123 is varied and thus a position of the coupling member 130 pressed by the contact is changed, the contact position between the coupling member 130 and the rebar can be precisely adjusted. As a result, the coupling member 130 is brought into close contact with the rebar to apply the pressure to the rebar, and thus if the rebar is applied by the tensile stress, the coupling member 130 supports the rebar firmly.

Figure 5:
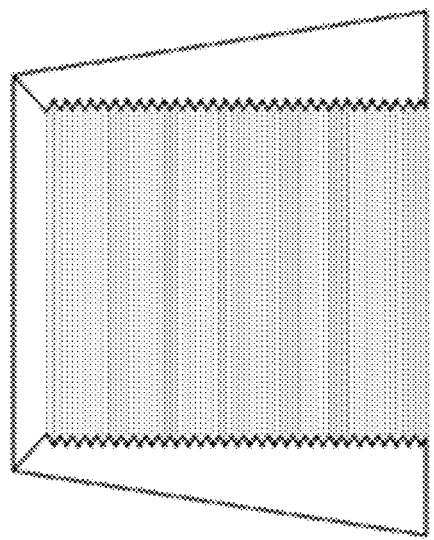
FIG. 5 is a plan view illustrating a coupling member of the rebar coupler in FIG. 2.
Figure 6:
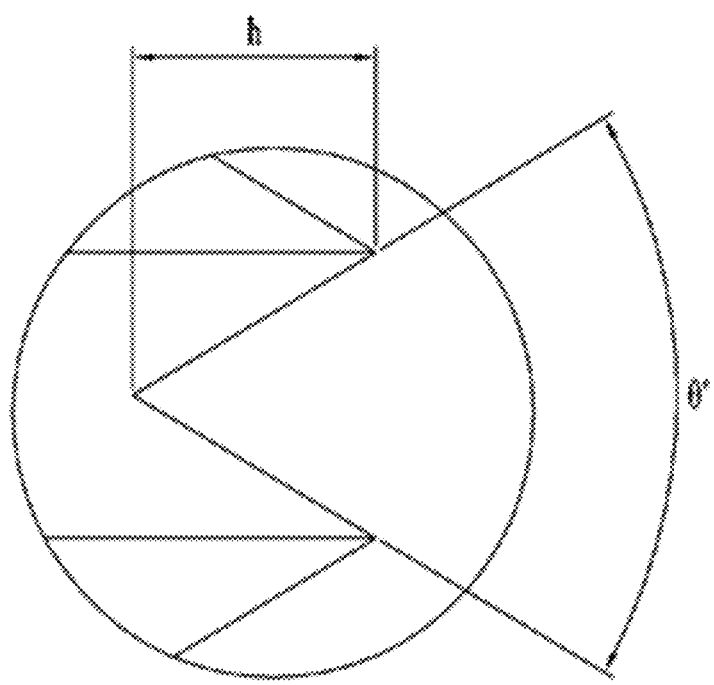
FIG. 6 is a partially enlarged view illustrating the coupling member of the rebar coupler in FIG. 5.

FIG. 5 is a plan view illustrating the coupling member of the rebar coupler in FIG. 2. FIG. 6 is a partially enlarged view illustrating the coupling member of the rebar coupler in FIG. 5.

Referring to FIGS. 5 and 6, the coupling member 130 slides between one guide portion 121 and the adjacent guide portion 121. As the rebar is fitted into the housing 110, the rebar is pressed by the contact of the coupling members 130. In this instance, the coupling members 130 are slid along the guide portions 121 by the inserting pressure of the rebar. The mounting member 120 is pressed at the same time when the coupling members 130 slide. The coupling members 130 can be returned to the original positions by the resilient member 140.

The outer peripheral surface of the coupling member 130 is formed in a flat or an inclined shape to correspond to the inner peripheral surface of the housing 110 or cover 150.

The inner peripheral surface of the coupling member 130 is provided with a threaded portion which is brought into contact with the outer peripheral surface of the rebar. A tooth angle $\ominus$ of the threaded portion is set in the range of about 50 to 75°, and preferably is 60°. The tooth angle $\ominus$ of the threaded portion can be selected depending upon the shape or kind of the rebar, or a deformation pattern or direction of the rebar. Also, a tooth pitch h of the threaded portion can be selected to correspond to the shape or size of the rebar so that friction is decreased in the inserting direction of the rebar and is increased in a removing direction of the rebar. In this embodiment, the tooth pitch h of the threaded portion is set in the range of about 0.4 to 1.3 mm, and preferably is 0.7 mm.

The coupling member 130 is made from a steel material or a composite material containing at least one of glass fiber and a carbon fiber.

The coupling members 130 may be disposed at a different height or spacing on the guide portions 121 on the basis of the flange 122. Therefore, the shape of the contact portion 123 (see FIG. 4) may be deformed according to the pressure applied to the coupling members 130. Therefore, since the rebar is brought into close contact with the coupling portions 130 and is supported by the coupling portions, strong tensile strength is applied to the rebar. For example, as compared to the structure capable of supporting the rebars at the same position, regardless of the shape of the deformations and ribs formed on the outer peripheral surface of the rebar, or the direction or spacing of the deformations, it is possible to increase the friction or interface between the rebar and the coupling members 130 by the structure of which the positions of the coupling members 130 to support the rebar on the guide portions 121 are varied, thereby responding to the strong tensile stress.

The resilient members 140 (see FIG. 2) are disposed at both ends of the housing 110 on the basis of the partition 113, and are resiliently deformed between the partition 113 and the mounting member 120 to urge the mounting member 120 and the coupling member 130.

The resilient member 140 is made from a steel material or a composite material containing at least one of glass fiber and a carbon fiber. Although FIG. 2 shows the resilient member 140 of a spiral shape, the resilient member may be formed in any shape to apply the resilient restoring force.

The cover 150 has a fastening portion 151 having a male threaded portion on the outer peripheral surface which is fastened to each female threaded portion formed on the inner peripheral surfaces of both ends of the housing 110, and a closing portion 152 integrally formed with the fastening portion 151 to close both ends of the housing 110 and having a through-hole through which the rebar passes.

The fastening portion 151 has a slope on the inner peripheral surface to correspond to the inclined shape of the coupling member 130. The slope is preferably formed to have the same angle as that of the inclined surface of the coupling member 130. When the fastening portion 151 is fastened to the housing 110, the coupling member 130 is slid between the mounting member 120 and the slope. The slope is fastened to each end of the housing 110 and supports the coupling member 130 which is pressed by the tensile stress of the rebar.

Figure 7:
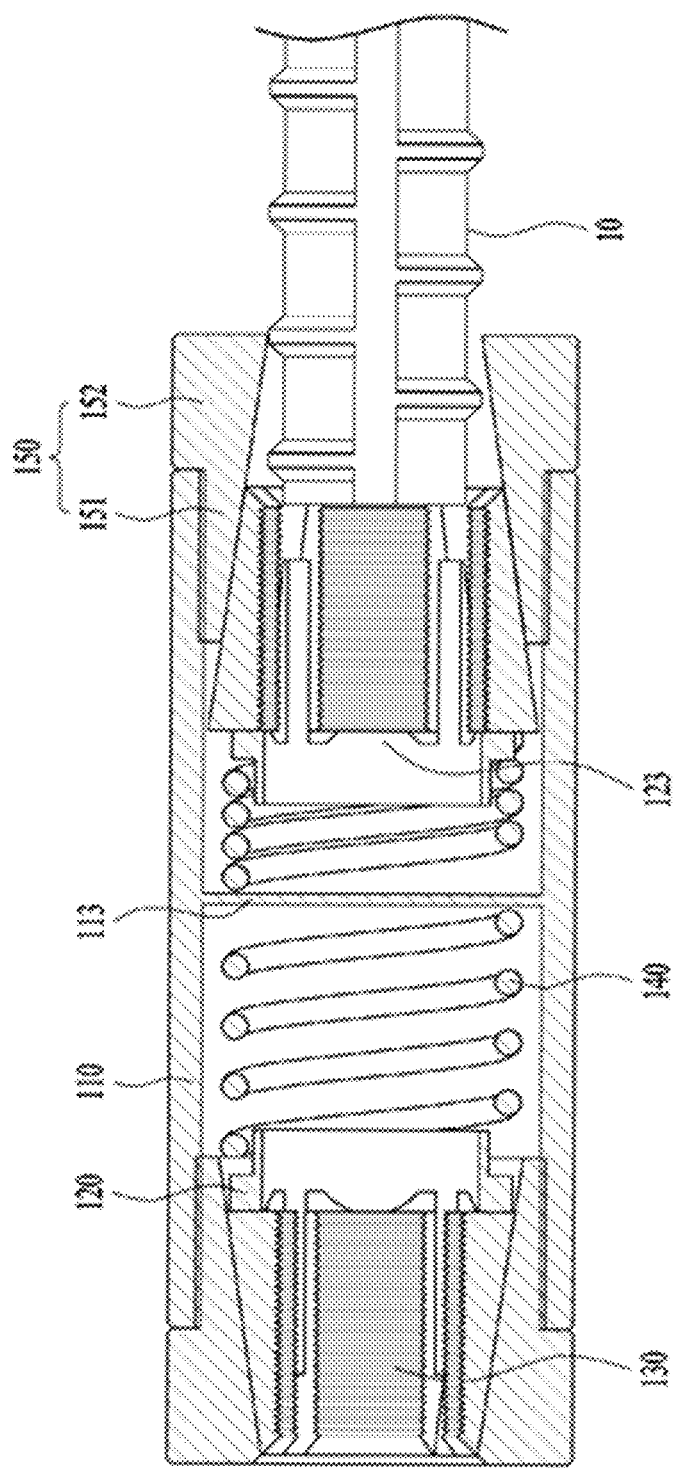
FIG. 7 is a cross-sectional view illustrating a connecting state of rebars by the rebar coupler in FIG. 2.

FIG. 7 is a cross-sectional view illustrating the connecting state of the rebars by the rebar coupler in FIG. 2. Hereinafter, it will be explained the state of coupling the rebars by the rebar coupler according to the present invention. Like reference numerals are attached to elements identical to those in the embodiment.

Referring to FIG. 7, the rebar coupler 100 includes the mounting member 120, the coupling member 130 and the resilient member 140 which are mounted in the housing 110, and the assembly of the rebar coupler 100 is completed by the cover 150. The left and right sides of the housing 110 are symmetrical to each other on the basis of the partition 113.

In FIG. 7, the first rebar 10 is coupled to the right side of the housing 110, and the second rebar (not illustrated) is not inserted in the left side of the housing.

The process of coupling the first rebar 10 to the right side of the housing 110 and the effect will be explained hereinafter, and the process of coupling the second rebar to the left side of the housing will be omitted.

First, when the first rebar 10 is inserted in the housing 110, the end of the first rebar 10 pass through the through-hole, and then is brought into contact with the coupling members 130.

The deformations formed on the outer peripheral surface of the first rebar 10 are brought into contact with the threaded portion of the coupling members 130. The coupling members 130 are guided by the mounting members 120, and are slid towards the inside of the housing. As the coupling members 130 are further moved towards the inside of the housing 110, the distance between the coupling members and the outer peripheral surface of the first rebar 10 is increased. Therefore, since the friction or interference between the coupling members 130 and the first rebar 10 is reduced in the process of inserting the first rebar 10, the coupling members 130 are easily engaged with the rebar.

In the process of inserting the first rebar 10, the coupling member 130 are slid in an internal direction of the housing 110, and simultaneously are returned to the original position in an external direction of the housing 110 by the restoring force of the resilient member 140. Of course, the coupling members 130 may be slid in a direction opposite to the internal direction of the housing 110 by a distance shorter than the inwardly moving distance due to the interference of the first rebar 10.

When the insertion of the first rebar 10 is completed, the coupling members 130 are returned to the original position, so that the coupling members 130 interfere in the first rebar 10. If the tensile stress is applied to the first rebar 10 to move the first rebar outwardly from the housing 110, the coupling members 130 are slid in the external direction of the housing 110 under the friction. Since the cover 150 has the slope, the coupling members 130 are pressed towards the outer peripheral surface of the first rebar 10, thereby increasing the friction or interference between the coupling members 130 and the first rebar 10. Therefore, the first rebar 10 is pressed by the coupling members 130, which prevents the first bar from moving away from the housing 110.

If the second rebar is coupled to the rebar housing in the above process, it is possible to easily connect the rebars with the rebar coupler 100, thereby extending the length of the rebars.

While the present invention has been described with reference to the particular illustrative embodiment, it is not to be restricted by the embodiment but only by the appended claims. It is to be appreciated that those skilled in the art can change or modify the embodiments without departing from the scope and spirit of the present invention.

The invention claimed is:

1. A rebar coupler comprising:
   a housing which is a cylindrical hollow body having at one end a first opening for receiving a first rebar, at the other end a second opening for receiving a second rebar, to connect the first rebar and the second rebar, and a partition disposed at a center thereof to divide the ends having the first and second openings;
   a mounting member inserted in each end of the housing and receiving the corresponding first and second rebars therein;
   a plurality of coupling members slidably disposed on the corresponding mounting member and being brought into contact with an outer peripheral surface of the corresponding inserted first and second rebars to prevent the first and second rebars from moving out from the rebar coupler;
   a resilient member configured to apply a restoring force to the coupling members so that the coupling members slid by the first and second rebars inserted in the corresponding mounting member are returned to an original position; and
   a cover fastened to both ends of the housing to prevent the mounting member and the coupling members from moving out from the housing due to a tensile force of the first and second rebars,
   each mounting members having a plurality of guide portions for guiding sliding movement of the coupling members along an inserting direction of the corresponding first and second rebars, a flange connecting ends of the guide portions, and a contact portion protruding from the flange towards the coupling members.

2. The rebar coupler according to claim 1, wherein the contact portion is integrally formed with the flange, but is made from a material different from that of the flange.

3. The rebar coupler according to claim 2, wherein the contact portion has first surfaces protruding from areas between the guide portions to be brought into contact with the coupling members, second surfaces disposed between the flange and the contact portion to be opposite to the first surfaces, and third surfaces for connecting both ends of the first surface and the second surface and deformed to correspond to a width of deformations of the corresponding first and second rebars if the first surfaces are pressed.

4. The rebar coupler according to claim 3, wherein the third surface is formed in a shape of a slope or an arc.

5. The rebar coupler according to claim 3, wherein each mounting member is provided with a spacing between the coupling members and the flange or between the contact portion and the guide portions in order to correspond to elastic deformation of a shape of the contact portions.

6. The rebar coupler according to claim 2, wherein the contact portion contains at least one of rubber, silicon and a synthetic resin having elasticity.

7. The rebar coupler according to claim 1, wherein an inner peripheral surface of the coupling members is provided with a threaded portion of a desired pattern which is brought into contact with an outer peripheral surface of the corresponding first and second rebars.

8. The rebar coupler according to claim 7, wherein a tooth angle of the threaded portion of the coupling members is set in the range of 50 to 75°.

9. The rebar coupler according to claim 7, wherein a tooth pitch of the threaded portion of the coupling members is set in the range of 0.4 to 1.3 mm.

10. The rebar coupler according to claim 1, wherein at least one of the housing, the mounting member, the coupling members, the resilient member and the cover is made from a composite material containing at least one of glass fiber and a carbon fiber.

* * * * *